US012651161B2

(12) United States Patent
Yamamoto et al.

(10) Patent No.: US 12,651,161 B2
(45) Date of Patent: Jun. 9, 2026

(54) COMPOSITION CONVERSION APPARATUS, COMPOSITION CONVERSION METHOD, AND COMPUTER READABLE MEDIUM

(71) Applicant: Mitsubishi Electric Corporation, Tokyo (JP)

(72) Inventors: Ryo Yamamoto, Tokyo (JP); Hidetomo Iwagawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 944 days.

(21) Appl. No.: 17/896,265

(22) Filed: Aug. 26, 2022

(65) Prior Publication Data

US 2022/0405594 A1 Dec. 22, 2022

Related U.S. Application Data

(63) Continuation of application No. PCT/JP2020/017512, filed on Apr. 23, 2020.

(51) Int. Cl.
*G06N 3/08* (2023.01)
*G06N 3/04* (2023.01)

(52) U.S. Cl.
CPC ................. *G06N 3/08* (2013.01); *G06N 3/04* (2013.01)

(58) Field of Classification Search
CPC ............ G06N 3/08; G06N 3/04; G06N 3/048; G06N 3/0499; G06N 3/063; G06N 3/0464; G06N 3/082; G06N 3/091; G06N 3/092; G06N 3/094; G06N 3/096; G06N 3/098; G06F 30/27; G06F 30/30; G06F 30/331; G06F 30/34

(Continued)

(56) References Cited

U.S. PATENT DOCUMENTS 5,355,437 A 10/1994 Takatori et al.
2015/0134583 A1 5/2015 Tamatsu et al.
(Continued)

FOREIGN PATENT DOCUMENTS

JP 4-24864 A 1/1992
JP 9-245011 A 9/1997
(Continued)

OTHER PUBLICATIONS

International Search Report, issued in PCT/JP2020/017512, PCT/ISA/210, dated Jul. 28, 2020.
(Continued)

*Primary Examiner* — Paul Dinh
(74) *Attorney, Agent, or Firm* — Birch, Stewart, Kolasch & Birch, LLP

(57) ABSTRACT

An analysis unit (110) analyzes a composition of a neural network composed of a plurality of layers and acquires a layer parameter (210) indicating an attribute of each of the plurality of layers. A conversion unit (120) converts the layer parameter (210) in such a way that processing performance of a circuit which executes an operation of the neural network does not deteriorate and a computation amount of the neural network increases. The conversion unit (120) increases the computation amount by treating the numbers of input/output edges in each of the plurality of layers as the layer parameter and increasing the numbers of input/output edges.

7 Claims, 16 Drawing Sheets

(58) Field of Classification Search

USPC ......................................................... 716/116

See application file for complete search history.

(56)                         References Cited

U.S. PATENT DOCUMENTS

| | | |
|---|---|---|
| 2018/0189650 A1 | 7/2018 | Wang et al. |
| 2019/0130245 A1 | 5/2019 | Sakaguchi |
| 2020/0005131 A1 | 1/2020 | Nakahara et al. |
| 2020/0202925 A1 | 6/2020 | Hayata et al. |
| 2022/0109742 A1* | 4/2022 | Kumar ..................... G06N 3/04 |

FOREIGN PATENT DOCUMENTS

| | | |
|---|---|---|
| JP | 3757722 B2 | 3/2006 |
| JP | 2015-95215 A | 5/2015 |
| JP | 2017-211735 A | 11/2017 |
| JP | 2018-92377 A | 6/2018 |
| JP | 2018-109947 A | 7/2018 |
| JP | 2019-139300 A | 8/2019 |
| WO | WO 2019/049686 A1 | 3/2019 |

OTHER PUBLICATIONS

Written Opinion of the International Searching Authority, issued in PCT/JP2020/017512, PCT/ISA/237, dated Jul. 28, 2020.

Yamamoto et al., "A study of FPGA architectures for Deep Neural Network in control devices", IEICE, Technical Report, vol. 119, No. 443, p. 239-244.

* cited by examiner

21 NN MODEL

100 COMPOSITION CONVERSION APPARATUS

22 CONVERTED NN MODEL

START

ACQUIRE LAYER PARAMETER FROM NN MODEL    S101

CALCULATE PROCESSING PERFORMANCE    S102

CONVERT LAYER PARAMETER IN SUCH WAY THAT COMPUTATION AMOUNT OF NN INCREASES, AND CALCULATE PROCESSING PERFORMANCE    S103

THERE IS NO PERFORMANCE DETERIORATION ?    S104

YES

NO

OUTPUT CONVERTED NN MODEL    S105

END

HARDWARE CONFIGURATION EXAMPLE OF NEURON MODEL OF NN MODEL 21

NUMBER OF IN-PARALLEL OUTPUTS

NUMBER OF IN-PARALLEL INPUTS

ACTIVATION COMPUTATION CORE

CONVOLUTION COMPUTATION CORE

CORRESPONDING TO LAYERS WHICH HAVE FOLLOWING ACTIVATION FUNCTION MECHANISMS
(1) Step (2) ReLu (3) Leaky ReLu

Fig. 6

210 . LAYER PARAMETER

| LAYER | INPUT EDGE | OUTPUT EDGE |
|---|---|---|
| FIRST LAYER | 16 | 198 |
| SECOND LAYER | 198 | 198 |
| THIRD LAYER | 198 | 198 |
| FOURTH LAYER | 198 | 16 |

NUMBER OF OUTPUT EDGES IN PREVIOUS LAYER AND NUMBER OF INPUT EDGES IN NEXT LAYER ARE SAME

| LAYER | INPUT EDGE | OUTPUT EDGE |
|---|---|---|
| FIRST LAYER | 16 | 199 |
| SECOND LAYER | 199 | 198 |
| THIRD LAYER | 198 | 198 |
| FOURTH LAYER | 198 | 16 |

BOLD LETTERS ARE NOT CHANGED SINCE THESE ARE SPECIFICATIONS

| LAYER | INPUT EDGE | OUTPUT EDGE |
|---|---|---|
| FIRST LAYER | 16 | 198 |
| SECOND LAYER | 198 | 198 |
| THIRD LAYER | 198 | 198 |
| FOURTH LAYER | 198 | 16 |

Fig. 8

LATENCY CALCULATION EQUATION (SUM OF LATENCY OF EACH LAYER)

| SECTION | COMPUTATION EQUATION [Cycle] |
|---|---|
| LATENCY (CYCLE) | SUM(latency(L1), latency(L2), ..., latency(LN)) |

LATENCY OF EACH LAYER
(DECIDED ACCORDING TO IN-PARALLEL NUMBER.
HOWEVER, IT IS ROUNDED UP WHEN IT IS
NOT DIVISIBLE)

latency(L#) =ROUNDUP (NUMBER OF INPUT EDGES/NUMBER OF IN-PARALLEL INPUTS) *
ROUNDUP (NUMBER OF OUTPUT EDGES/NUMBER OF IN-PARALLEL OUTPUTS)

Fig. 9

BELOW, EXAMPLES IN WHICH EACH OF NUMBER OF IN-PARALLEL INPUTS AND NUMBER OF IN-PARALLEL OUTPUTS IS 7

LAYER PARAMETER 210 OF NN MODEL 21
(211: FIRST PARAMETER)

NOT DIVISIBLE BY IN-PARALLEL NUMBER

| LAYER | INPUT EDGE | OUTPUT EDGE |
|---|---|---|
| FIRST LAYER | 16 | 198 |
| SECOND LAYER | 198 | 198 |
| THIRD LAYER | 198 | 198 |
| FOURTH LAYER | 198 | 16 |

Total Latency = 1856

SAME PERFORMANCE

LAYER PARAMETER 210 OF CONVERTED NN MODEL 22
(212: SECOND PARAMETER)

- SCALE INCREASE => ACCURACY UP
- THERE ARE MANY CASES OF BEING DIVISIBLE BY IN-PARALLEL NUMBER

| LAYER | INPUT EDGE | OUTPUT EDGE |
|---|---|---|
| FIRST LAYER | 16 | 203 |
| SECOND LAYER | 203 | 203 |
| THIRD LAYER | 203 | 203 |
| FOURTH LAYER | 203 | 16 |

Total Latency = 1856

MULTIPLY-ACCUMULATE PROCESS EQUIVALENT TO APPROXIMATELY 4K CAN BE ADDED WHILE MAINTAINING PERFORMANCE

Fig. 11

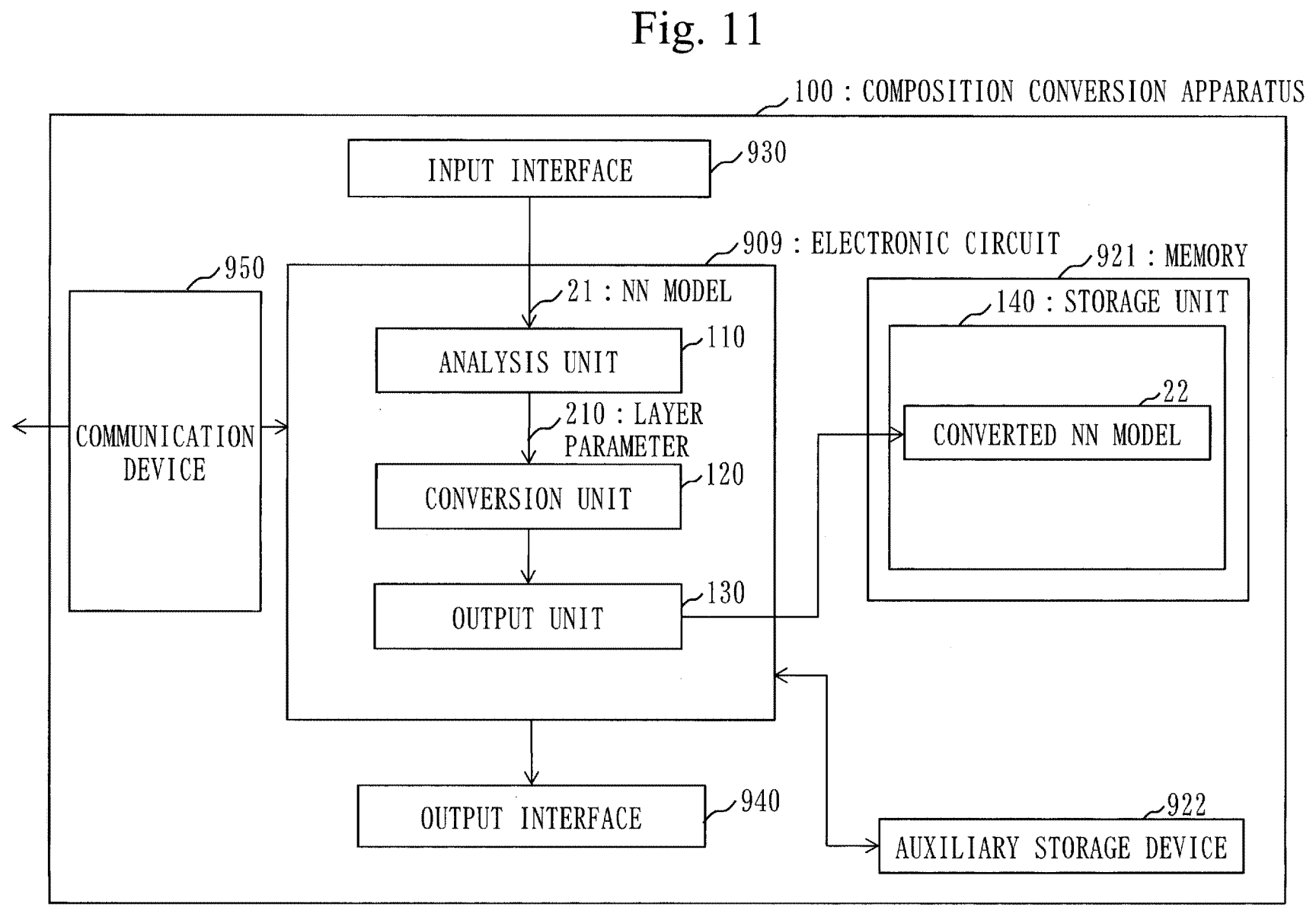

100 : COMPOSITION CONVERSION APPARATUS

909 : ELECTRONIC CIRCUIT

921 : MEMORY

140 : STORAGE UNIT

22 : CONVERTED NN MODEL

930 : INPUT INTERFACE

21 : NN MODEL

110 : ANALYSIS UNIT

210 : LAYER PARAMETER

120 : CONVERSION UNIT

130 : OUTPUT UNIT

940 : OUTPUT INTERFACE

950 : COMMUNICATION DEVICE

922 : AUXILIARY STORAGE DEVICE

Fig. 13

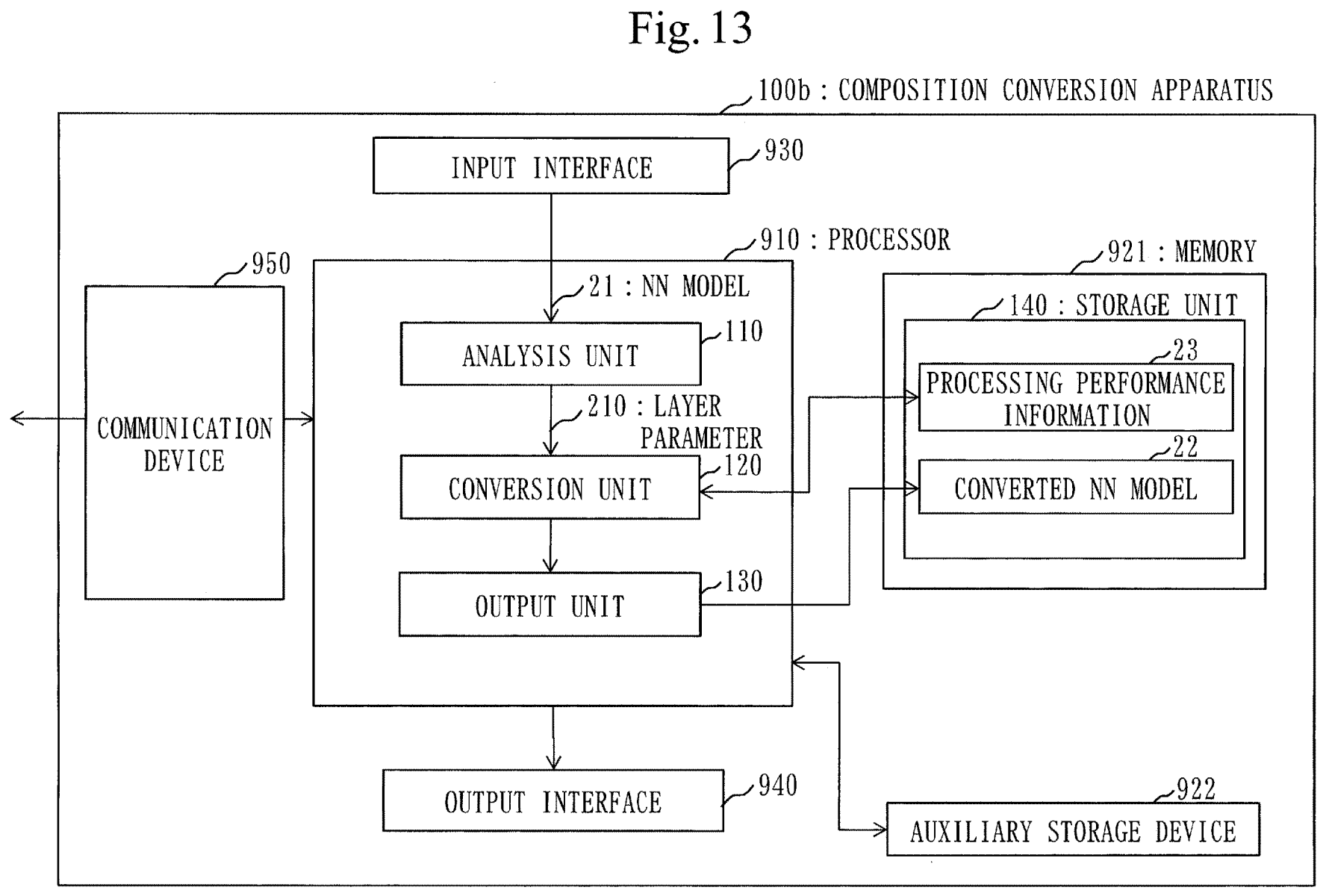

100b : COMPOSITION CONVERSION APPARATUS

930 : INPUT INTERFACE

910 : PROCESSOR

921 : MEMORY

140 : STORAGE UNIT

23 : PROCESSING PERFORMANCE INFORMATION

22 : CONVERTED NN MODEL

21 : NN MODEL

110 : ANALYSIS UNIT

210 : LAYER PARAMETER

120 : CONVERSION UNIT

130 : OUTPUT UNIT

940 : OUTPUT INTERFACE

922 : AUXILIARY STORAGE DEVICE

950 : COMMUNICATION DEVICE

Fig. 14

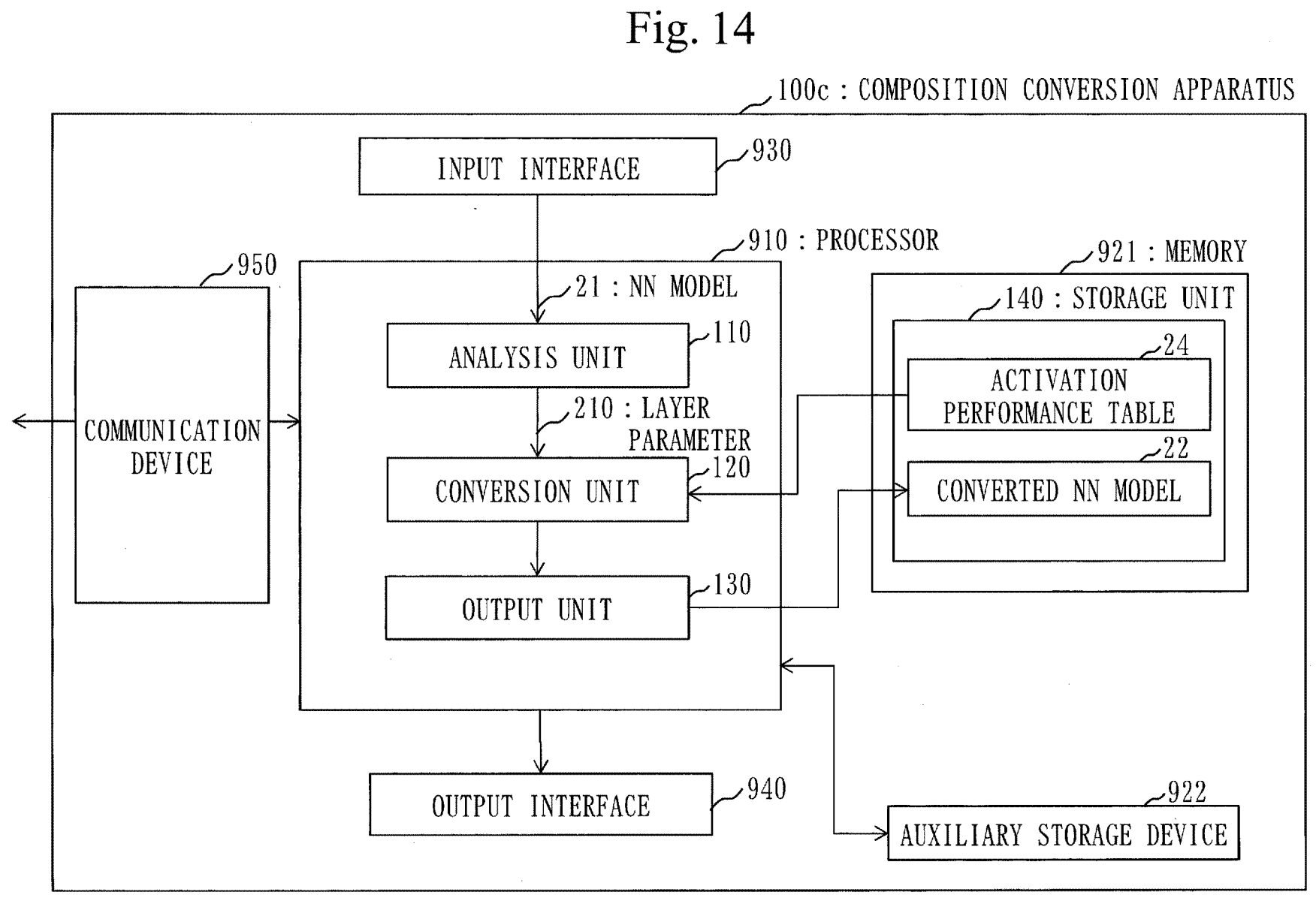

100c : COMPOSITION CONVERSION APPARATUS

930 : INPUT INTERFACE

910 : PROCESSOR

921 : MEMORY

140 : STORAGE UNIT

24 : ACTIVATION PERFORMANCE TABLE

22 : CONVERTED NN MODEL

21 : NN MODEL

110 : ANALYSIS UNIT

210 : LAYER PARAMETER

120 : CONVERSION UNIT

130 : OUTPUT UNIT

940 : OUTPUT INTERFACE

950 : COMMUNICATION DEVICE

922 : AUXILIARY STORAGE DEVICE

Fig.16

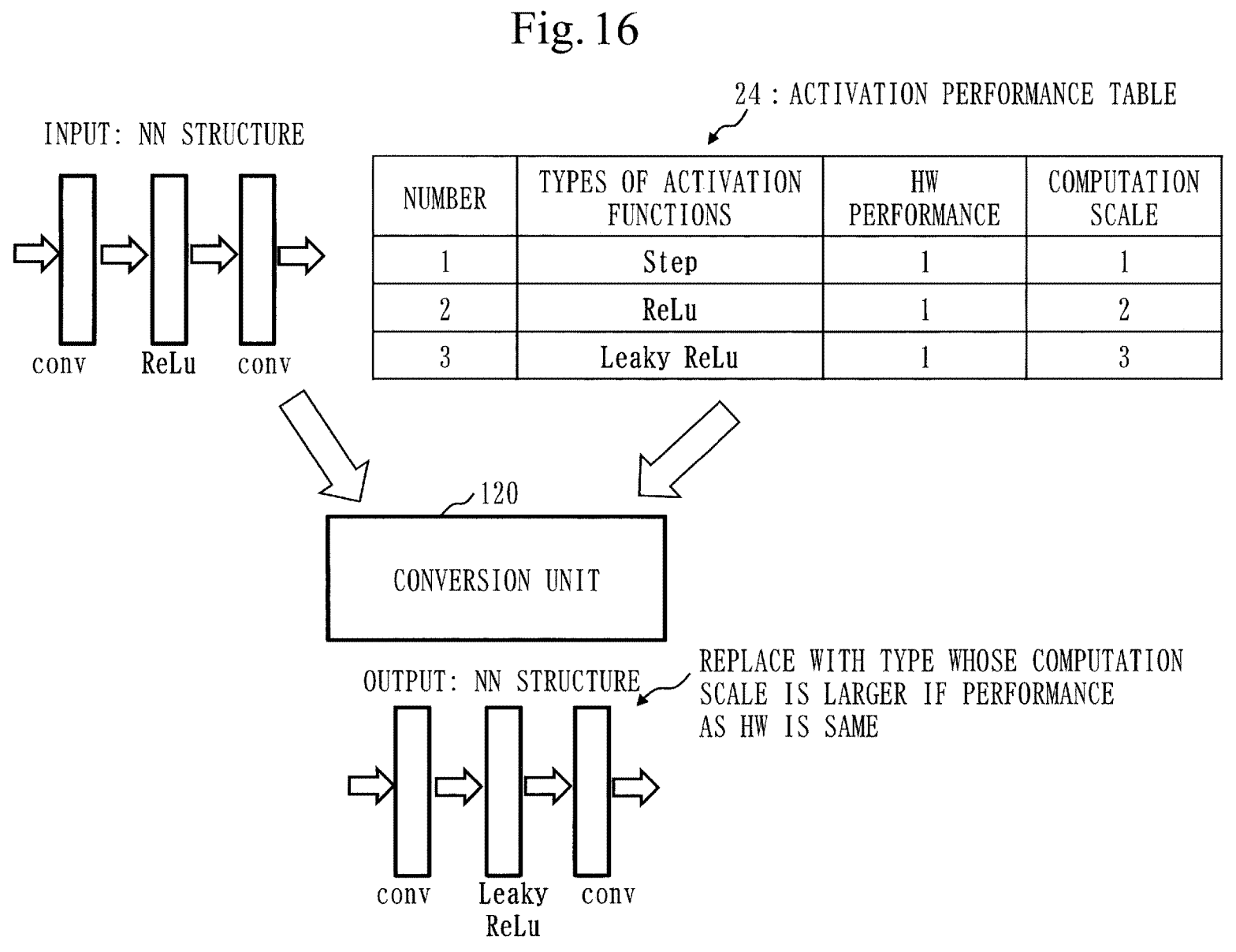

24 : ACTIVATION PERFORMANCE TABLE

| NUMBER | TYPES OF ACTIVATION FUNCTIONS | HW PERFORMANCE | COMPUTATION SCALE |
|--------|-------------------------------|----------------|-------------------|
| 1 | Step | 1 | 1 |
| 2 | ReLu | 1 | 2 |
| 3 | Leaky ReLu | 1 | 3 |

INPUT: NN STRUCTURE conv    ReLu    conv

120

CONVERSION UNIT

REPLACE WITH TYPE WHOSE COMPUTATION SCALE IS LARGER IF PERFORMANCE AS HW IS SAME

OUTPUT: NN STRUCTURE conv    Leaky ReLu    conv

COMPOSITION CONVERSION APPARATUS, COMPOSITION CONVERSION METHOD, AND COMPUTER READABLE MEDIUM

CROSS REFERENCE TO RELATED APPLICATIONS

This application is a Continuation of PCT International Application No. PCT/JP2020/017512 filed on Apr. 23, 2020, which is hereby expressly incorporated by reference into the present application.

TECHNICAL FIELD

The present disclosure relates to a composition conversion apparatus, a composition conversion method, and a composition conversion program.

BACKGROUND ART

In order to realize a neural network, a large scale of computation is necessary. When it is desired to process the neural network on an embedded device in real time, there is a case where it cannot be realized without an expensive device if the neural network is implemented as it is. Further, in order for an inexpensive device to process the neural network in real time, a volume reduction by reducing a computation amount in the neural network is necessary.

However, as processing performance is improved by the volume reduction, there is a problem that recognition accuracy deteriorates. In general, the larger the computation amount is, the higher the recognition accuracy tends to be. That is, the performance and the computation amount are in a trade-off relation.

Patent Literature 1 discloses a technique of reducing a multiply-accumulate computation amount in an inference process by reducing a dimensional quantity of a weight matrix. In Patent Literature 1, in order to minimize a decrease in the recognition accuracy due to the reduction in the computation amount, the closer to the first layer in the neural network the layer is, the smaller the reduction amount is, and the closer to the last layer the layer is, the larger the reduction amount is.

CITATION LIST

Patent Literature

Patent Literature 1: JP2018-109947A

SUMMARY OF INVENTION

Technical Problem

In the technique of Patent Literature 1, since the reduction in the multiply-accumulate computation amount is necessary, there is a problem that the recognition accuracy possibly deteriorates.

The present disclosure aims to improve recognition accuracy while maintaining performance.

Solution to Problem

A composition conversion apparatus according to the present disclosure includes:

an analysis unit to analyze a composition of a neural network composed of a plurality of layers and acquire a layer parameter indicating an attribute of each of the plurality of layers; and a conversion unit to convert the layer parameter in such a way that processing performance of a circuit which executes an operation of the neural network does not deteriorate and a computation amount of the neural network increases.

Advantageous Effects of Invention

According to a composition conversion apparatus according to the present disclosure, it is possible to improve recognition accuracy while maintaining performance since layer parameters are converted in such a way that processing performance of a circuit does not deteriorate and a computation amount in a neural network increases.

BRIEF DESCRIPTION OF DRAWINGS

FIG. 6 is an example of a layer parameter of the NN model according to the first embodiment.

FIG. 8 is a diagram illustrating a calculation method of latency according to the first embodiment.

FIG. 9 is an example of increasing a computation amount without deteriorating processing performance in the NN structure according to the first embodiment.

FIG. 11 is a configuration example of the composition conversion apparatus according to a modification example of the first embodiment.

FIG. 13 is a configuration example of a composition conversion apparatus according to a second embodiment.

FIG. 14 is a configuration example of a composition conversion apparatus according to a third embodiment.

FIG. 16 is an example of increasing a computation amount without deteriorating processing performance in an NN structure according to the third embodiment.

DESCRIPTION OF EMBODIMENTS

First Embodiment

*Description of Configuration*

Figure 1:
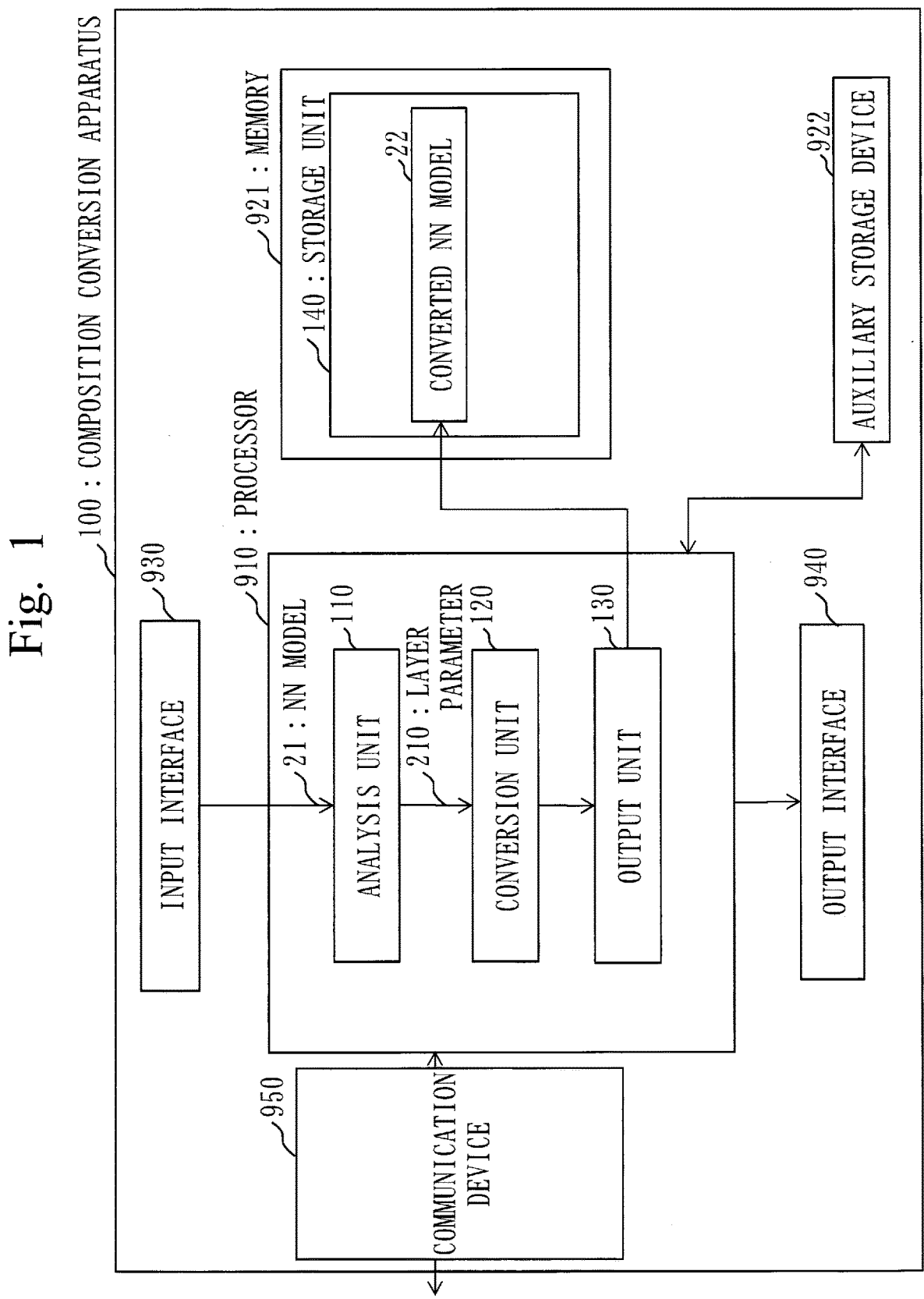
FIG. 1 is a configuration example of a composition conversion apparatus according to a first embodiment.

With reference to FIG. 1, a configuration example of a composition conversion apparatus 100 according to the present embodiment will be described.

The composition conversion apparatus 100 is a computer. The composition conversion apparatus 100 includes a processor 910 and also includes other pieces of hardware such as a memory 921, an auxiliary storage device 922, an input interface 930, an output interface 940, and a communication device 950. The processor 910 is connected to the other pieces of hardware via a signal line and controls these other pieces of hardware.

The composition conversion apparatus 100 includes an analysis unit 110, a conversion unit 120, an output unit 130, and a storage unit 140 as functional elements. The storage unit 140 stores a converted NN model 22. NN stands for Neural Network.

Functions of the analysis unit 110, the conversion unit 120, and the output unit 130 are realized by software. The storage unit 140 is included in the memory 921 or the auxiliary storage device 922.

The processor 910 is a device which executes a composition conversion program. The composition conversion program is a program which realizes the functions of the analysis unit 110, the conversion unit 120, and the output unit 130.

The processor 910 is an IC (Integrated Circuit) which performs computation processing. Specific examples of the processor 910 are a CPU (Central Processing Unit), a DSP (Digital Signal Processor), and a GPU (Graphics Processing Unit).

The memory 921 is a storage device which stores data temporarily. A specific example of the memory 921 is an SRAM (Static Random Access Memory) or a DRAM (Dynamic Random Access Memory).

The auxiliary storage device 922 is a storage device which stores data. A specific example of the auxiliary storage device 922 is an HDD. Further, the auxiliary storage device 922 may be a portable storage medium such as an SD (registered trademark) memory card, a CF, a NAND flash, a flexible disk, an optical disk, a compact disk, a blu-ray (registered trademark) disk, or a DVD. Note that, HDD stands for Hard Disk Drive. SD (registered trademark) stands for Secure Digital. CF stands for CompactFlash (registered trademark). DVD stands for Digital Versatile Disk.

The input interface 930 is a port to be connected to an input device such as a mouse, a keyboard, or a touch panel. The input interface 930 is specifically a USB (Universal Serial Bus) terminal. Note that, the input interface 930 may be a port to be connected to a LAN (Local Area Network). The analysis unit 110 acquires a neural network model (hereinafter, referred to as an NN model 21) via the input interface 930.

The output interface 940 is a port to which a cable of an output device such as a display is connected. The output interface 940 is specifically a USB terminal or an HDMI (registered trademark) (High-Definition Multimedia Interface) terminal. The display is specifically an LCD (Liquid Crystal Display). The output unit 130 may output a converted neural network model (hereinafter, referred to as a converted NN model 22) to the output device via the output interface 940.

The communication device 950 includes a receiver and a transmitter. The communication device 950 is wirelessly connected to a communication network such as a LAN, the Internet, or a telephone line. The communication device 950 is specifically a communication chip or an NIC (Network Interface Card). The composition conversion apparatus 100 may acquire the NN model 21 via the communication device 950. Also, the composition conversion apparatus 100 may transmit the converted NN model 22 to another device via the communication device 950.

The composition conversion program is read by the processor 910 and executed by the processor 910. Not only the composition conversion program but also an OS (Operating System) is stored in the memory 921. The processor 910 executes the composition conversion program while executing the OS. The composition conversion program and the OS may be stored in the auxiliary storage device 922. The composition conversion program and the OS which are stored in the auxiliary storage device 922 are loaded into the memory 921 and executed by the processor 910. Note that, the composition conversion program may be incorporated into the OS partially or entirely.

The composition conversion apparatus 100 may include a plurality of processors which substitute for the processor 910. The plurality of processors share execution of the composition conversion program. Each processor is a device which executes the composition conversion program as with the processor 910.

Data, information, a signal value, and a variable value which are utilized, processed, or outputted by the composition conversion program are stored in the memory 921, the auxiliary storage device 922, or a register or a cache memory in the processor 910.

"unit" in each unit of the analysis unit 110, the conversion unit 120, and the output unit 130 may be replaced by "process", "procedure", or "step". Also, "process" of an analysis process, a conversion process, and an output process may be replaced by "program", "program product", or "computer readable recording medium recording a program".

The composition conversion program causes the computer to execute each process, each procedure, or each step obtained by replacing "unit" in each unit mentioned above with "process", "procedure", or "step". Further, the composition conversion method is a method implemented by execution of the composition conversion program by the composition conversion apparatus 100.

The composition conversion program may be stored in a computer readable recording medium or a storage medium and provided. Alternatively, the composition conversion program may be provided as a program product.

<Input/Output into and from Composition Conversion Apparatus 100>

Figure 2:
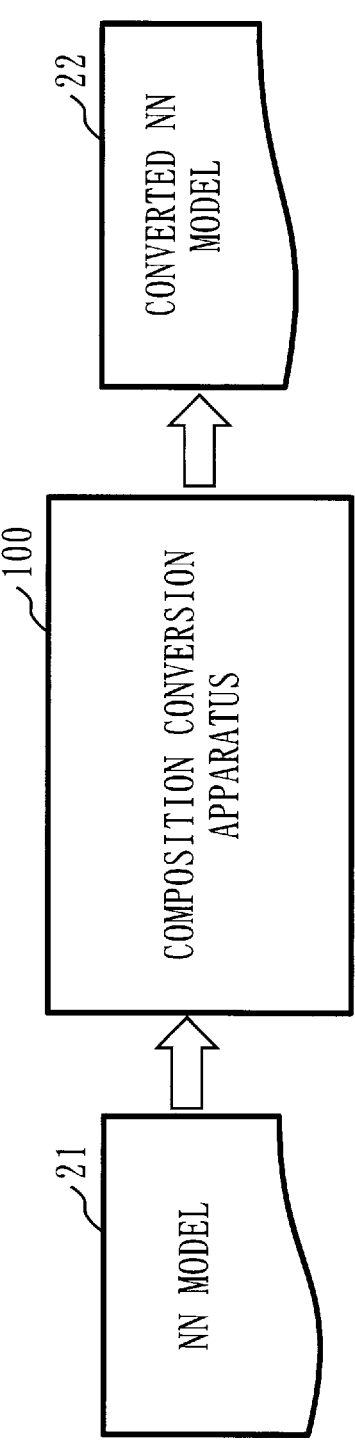
FIG. 2 is an example of input/output of the composition conversion apparatus according to the first embodiment.

FIG. 2 is a diagram illustrating an example of input/output into and from the composition conversion apparatus 100 according to the present embodiment.

The composition conversion apparatus 100 inputs the NN model 21 and outputs the converted NN model 22.

Each of the NN model 21 and the converted NN model 22 is a model of a neural network including a plurality of layers. The neural network including the plurality of layers is also referred to as a DNN (deep neural network). Each of the NN model 21 and the converted NN model 22 has an NN structure. The NN structure is also referred to as a DNN structure.

Further, the neural network including the plurality of layers has a layer parameter 210 indicating an attribute of each of the plurality of layers. The layer parameter 210 is specifically pieces of information such as the numbers of input/output edges in each of the plurality of layers, and an activation function in each of the plurality of layers.

Each of the NN model 21 and the converted NN model 22 is specifically prototxt in a Caffe tool.

Note that, in the present embodiment, a neural network in which the layer parameter 210 of the NN model 21 has been converted is referred to as the converted NN model 22.

\*\*\*Description of Outline of Operation\*\*\*

Figure 3:
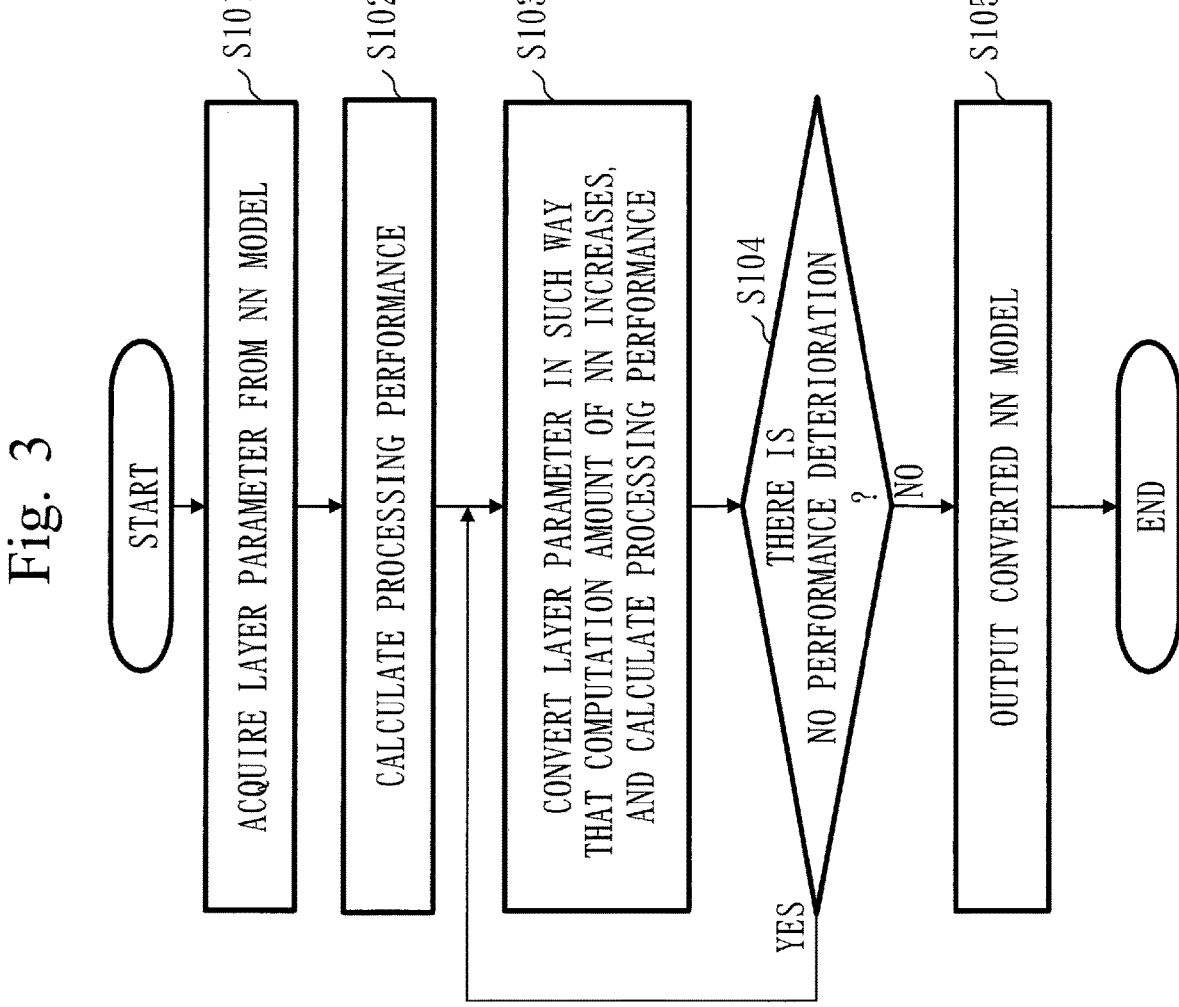
FIG. 3 is an operation outline example of the composition conversion apparatus according to the first embodiment.

FIG. 3 is a diagram illustrating an outline of operations of the composition conversion apparatus 100 according to the present embodiment.

In step S101, the analysis unit 110 acquires the NN model 21. The analysis unit 110 analyzes a composition of the neural network composed of the plurality of layers, in the NN model 21 and acquires the layer parameter 210 indicating the attribute of each of the plurality of layers.

Next, the conversion unit 120 converts the layer parameter 210 in such a way that processing performance of a circuit which executes operations of the neural network does not deteriorate and a computation amount in the neural network increases. Specifically, it is as follows.

In step S102, the conversion unit 120 calculates processing performance as first processing performance, using a first parameter 211 which is a current layer parameter 210.

In step S103, the conversion unit 120 calculates processing performance as second processing performance, using as the layer parameter 210, a second parameter 212 whose computation amount is larger than the first parameter 211.

In step S104, the conversion unit 120 determines whether or not the second processing performance has deteriorated from the first processing performance.

If the second processing performance has not deteriorated from the first processing performance, the second parameter 212 is treated as the first parameter 211 which is the current layer parameter 210, the process returns to step S103, and the processes are repeated.

If the second processing performance has deteriorated from the first processing performance, the process proceeds to step S105.

In step S105, the output unit 130 outputs as the converted NN model 22, the neural network in which the second parameter 212 is treated as the layer parameter 210.

\*\*\*Description of Operation Example\*\*\*

Figure 4:
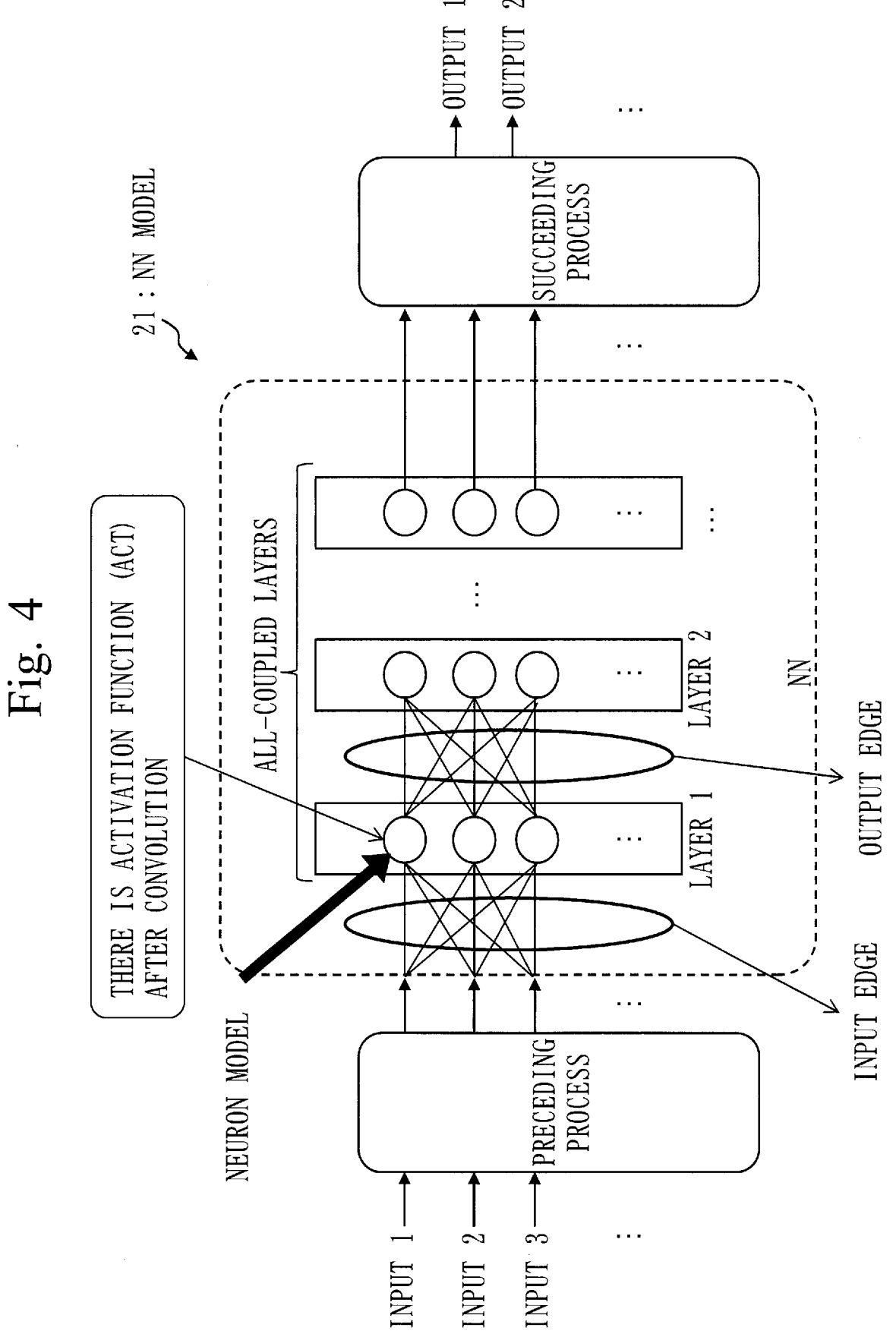
FIG. 4 is an example of an NN structure of an NN model according to the first embodiment.

FIG. 4 is a diagram illustrating an example of an NN structure of the NN model 21 according to the present embodiment.

Figure 5:
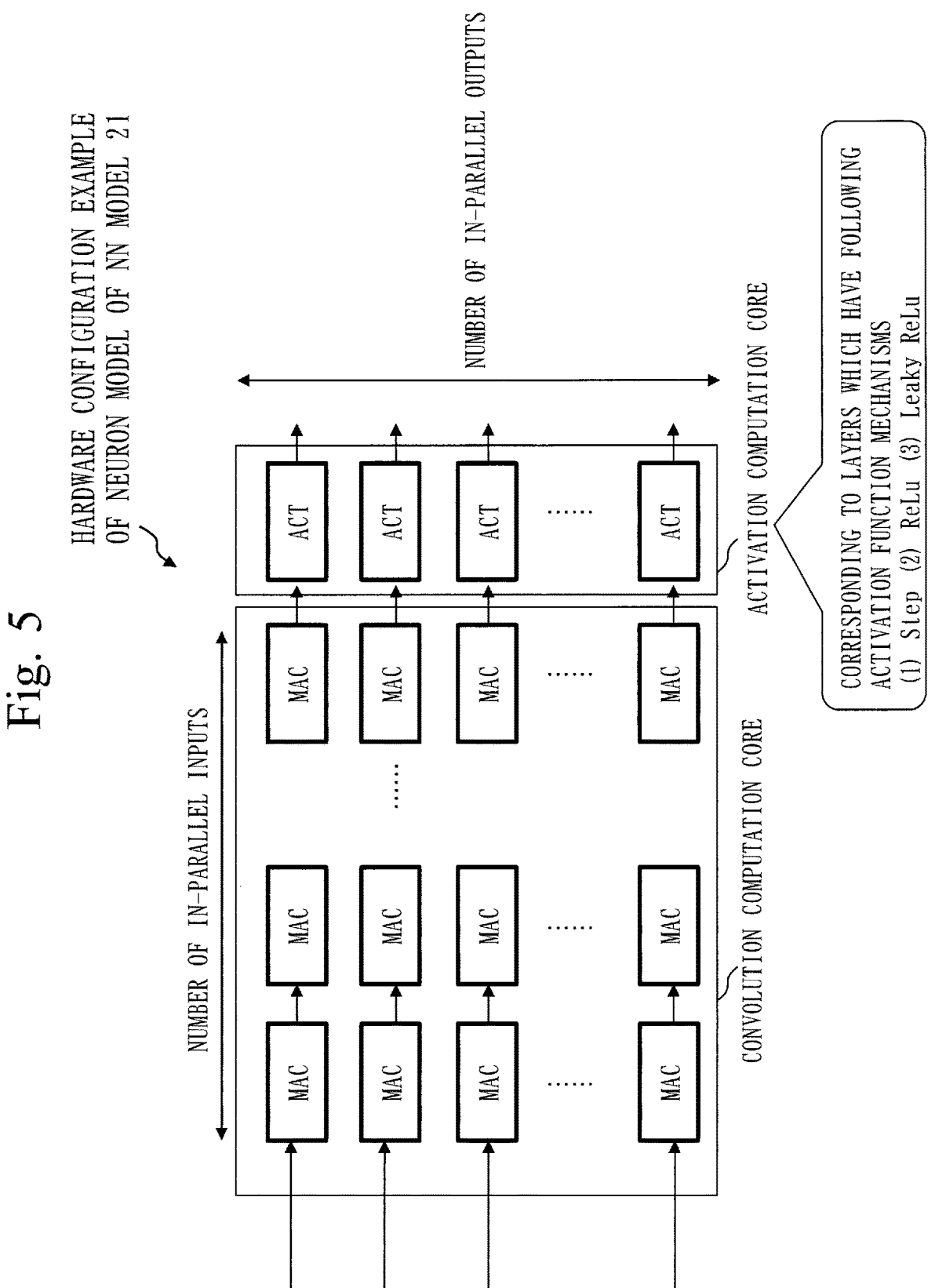
FIG. 5 is a hardware configuration example of a neuron model of the NN model according to the first embodiment.

FIG. 5 is a diagram illustrating a hardware configuration example of a neuron model of the NN model 21 according to the present embodiment.

FIG. 6 is a diagram illustrating an example of the layer parameter 210 of the NN model 21 according to the present embodiment.

As illustrated in FIG. 4, the NN structure of the NN model 21 is an all-coupled DNN structure. In the present embodiment, descriptions will be given using the all-coupled DNN structure, however the present embodiment can also be applied to a non-all-coupled feedforward CNN (Convolutional Neural Network) structure.

Each layer has an activation function after a convolution process. Also, in some cases, there is a process such as Pooling or batch normalization, between layers, however the process is omitted in order to simplify descriptions.

FIG. 5 illustrates a convolution circuit architecture which has been made into a circuit with an FPGA, as a hardware configuration example of executing the neuron model of the NN model 21. FPGA stands for Field-Programmable Gate Array.

MAC is a convolution computation core. ACT is an activation computation core which executes the activation function. The activation computation core corresponds to a layer (activation function layer) which has an activation function mechanism such as Step, ReLu, and Leaky ReLu.

The computation amount in each layer of the NN structure is decided according to the number of in-parallel inputs and the number of in-parallel outputs in a neuron. The computation amount in each layer of the NN structure is also referred to as a scale of each layer of the NN structure.

As illustrated in FIG. 6, in the present embodiment, the layer parameter 210 is the numbers of input/output edges in each of the plurality of layers. In the NN structure, the number of input edges and the number of output edges in each layer are obtained as parameters.

There is a constraint on a change of the layer parameter 210. The number of input edges in a first layer and the number of output edges in a last layer are not changed since these are decided as specifications of the neural network. Further, in a preceding and next layers, the number of output edges in the preceding layer and the number of input edges in the next layer are the same.

Figure 7:
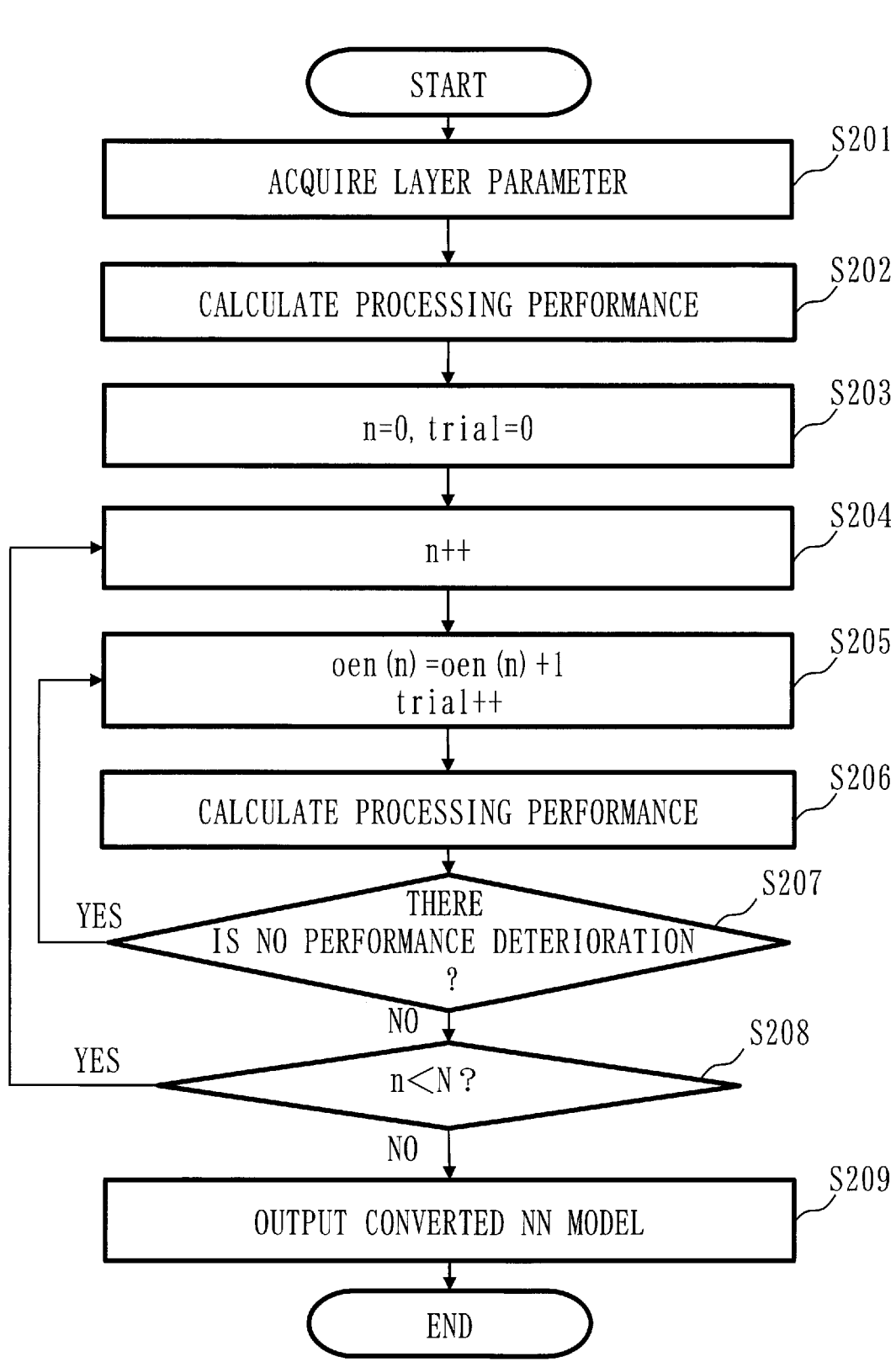
FIG. 7 is a flow diagram illustrating an operation example of a composition conversion process of the composition conversion apparatus according to the first embodiment.

FIG. 7 is a flow diagram illustrating an operation example of a composition conversion process of the composition conversion apparatus 100 according to the present embodiment.

In step S201, the analysis unit 110 acquires the NN model 21. The analysis unit 110 analyzes the composition of the neural network composed of the plurality of layers, in the NN model 21 and acquires the layer parameter 210 indicating the attribute of each of the plurality of layers. Specifically, the analysis unit 110 performs syntax analysis (parsing) on the NN model 21 in an NN format defined by a learning framework and acquires the layer parameter 210 in the NN structure of the NN model 21.

As illustrated in FIG. 6, in the present embodiment, the layer parameter 210 is the numbers of input/output edges in each of the plurality of layers.

The process of step S201 corresponds to step S101.

The conversion unit 120 increases the computation amount by treating as the layer parameter 210, the numbers of input/output edges in each of the plurality of layers in the NN structure of the NN model 21 and increasing the numbers of input/output edges. Note that, increasing the computation amount in each layer is also referred to as increasing the scale of each layer.

In step S202, the conversion unit 120 uses the layer parameter 210 as the first parameter 211 and calculates the processing performance of the NN structure of the NN model 21 as the first processing performance.

Note that, the processing performance of the NN structure is acquired as a sum of latency in each of the plurality of layers.

FIG. 8 is a diagram illustrating a calculation method of the latency according to the present embodiment.

The latency of the NN structure is calculated as the sum of the latency in each layer. Latency for one cycle of the NN structure of the NN model 21 is presumed to be Lat(org). At this time, the calculation is Lat(org)=SUM(latency(L1), latency(L2), . . . , latency(LN)).

Here, $L\#$ is latency in the $\#$-th layer. Further, it is presumed that the plurality of layers in the NN structure of the NN model 21 have the first to N-th layers. N is a natural number.

Further, the latency in each layer of the NN structure is decided according to the numbers of in-parallel inputs/outputs in each layer. However, if the numbers of edges are not divisible by the numbers of in-parallel inputs/outputs, solutions are rounded up. Specifically, a latency calculation equation for each layer is latency(L#)=ROUNDUP (the number of input edges/the number of in-parallel inputs) *ROUNDUP (the number of output edges/the number of in-parallel outputs).

The process of step S202 corresponds to step S102. Lat(org) is equivalent to the first processing performance in step S102.

In step S203, the conversion unit 120 initializes n and trial. Specifically, the initialization is n=0 and trial=0. Here, n is a number of the layer subject to the increase in the computation amount in the NN structure. Further, trial is the number of times the conversion of the layer parameters has been executed. n and trial are integers equal to or larger than zero.

In step S204, the conversion unit 120 increments n.

In step S205, the conversion unit 120 increases the number of output edges in the n-th layer by one in order to increase the computation amount in the n-th layer. Specifically, the number of output edges is oen(n)=oen(n)+1.

Here, oen(n) is the number of output edges in the n-th layer.

Further, the conversion unit 120 increments trial. Consequently, a change of the layer parameter 210 in the n-th layer in step S205 means a change at the trial-th time.

In step S206, the conversion unit 120 calculates latency of the NN structure after the change at the trial-th time, that is Lat(trial). A calculation method is the same as the method described in FIG. 8. Lat(trial) is equivalent to the second processing performance in step S103.

In step S207, the conversion unit 120 determines whether or not Lat(trial) which is the latency of the NN structure after the number of output edges in the n-th layer is increased by one has deteriorated from Lat(org) which is the latency of the NN structure before the change. Specifically, the following processes are performed.

If Lat(trial) has not deteriorated from Lat(org), the conversion unit 120 returns to step S205, increases the number of output edges in the n-th layer by one, and repeats the subsequent processes.

If Lat(trial) has deteriorated from Lat(org), the conversion unit 120 proceeds to step S208. At this time, the conversion unit 120 proceeds to step S208 after restoring the number of output edges in the n-th layer to the previous number by decreasing by one When the above-described process is written in a programming language specifically, it is to be as follows, for example.

If(Lat(org)<Lat(trial)) oen(n)=oen(n)−1 and goto S208
     else goto S205

In step S208, the conversion unit 120 determines whether or not n is smaller than N.

If n is smaller than N, it means that an unprocessed layer exists. Therefore, the process returns to step S204, and the conversion unit 120 increments n and repeats the subsequent processes for the next layer.

If n is not smaller than N, it means that the processes for all layers have been completed. Therefore, the process proceeds to step S209.

In step S209, the output unit 130 outputs as the converted NN model 22, the neural network of the NN structure which has the current layer parameter.

The process of step S209 corresponds to the process of step S105.

Further, the processes from step S203 to step S208 correspond to the processes of step S103 and step S104.

FIG. 9 is a diagram illustrating an example of increasing the computation amount without deteriorating the processing performance in the NN structure according to the present embodiment.

In the NN structure of the NN model 21 input into the composition conversion apparatus 100, each of the number of in-parallel inputs and the number of in-parallel outputs is presumed to be "7".

Further, the layer parameter 210 at the top is presumed to be of the NN structure of the NN model 21 input into the composition conversion apparatus 100. Further, the layer parameter 210 at the bottom is presumed to be of the NN structure of the converted NN model 22 output from the composition conversion apparatus 100.

A sum of the latency in each layer, Total Latency, in the NN structure of the NN model 21 at the top is calculated. As described above, if the solution is not divisible, the solution is rounded up.

first layer: latency(L1) = ROUNDUP(16/7)*ROUNDUP(198/7) ≈ 87
second layer: latency(L2) = ROUNDUP(198/7)*ROUNDUP(198/7) ≈ 841
third layer: latency(L3) = ROUNDUP(198/7)*ROUNDUP(198/7) ≈ 841
fourth layer: latency(L4) = ROUNDUP(198/7)*ROUNDUP(16/7) ≈ 87

Therefore, the calculation is to be Total Latency=latency (L1)+latency(L2)+latency(L3)+latency(L4)=1856.

In the NN structure of the converted NN model 22 at the bottom, the numbers of output edges "203" in the first to third layers are the numbers divisible by the number of in-parallel outputs "7".

In the NN structure of the converted NN model 22 at the bottom, the sum of the latency in each layer, Total Latency, is calculated.

first layer: latency(L1) = ROUNDUP(16/7)*ROUNDUP(203/7) ≈ 87
second layer: latency(L2) = ROUNDUP(203/7)*ROUNDUP(203/7) ≈ 841
third layer: latency(L3) = ROUNDUP(203/7)*ROUNDUP(203/7) ≈ 841
fourth layer: latency(L4) = ROUNDUP(203/7)*ROUNDUP(16/7) ≈ 87

Therefore, the calculation is to be Total Latency=latency (L1)+latency(L2)+latency(L3)+latency(L4)=1856.

As calculated above, the processing performance of the NN structure of the NN model 21 and the processing performance of the NN structure of the converted NN model 22 are the same performance. However, compared with the NN structure of the NN model 21, a multiply-accumulate process equivalent to approximately 4K can be added to the NN structure of the converted NN model 22.

Specifically, the number of times of multiply-accumulate computations in the NN structure of each of the NN model 21 and the converted NN model 22 is calculated as follows.

"the number of times of the multiply-accumulate computations in the NN model 21"=16*198 (first layer)+198*198 (second layer)+198*198 (third layer)+198*16 (fourth layer)=84744

"the number of times of the multiply-accumulate computations in the converted NN model 22"=16*203 (first layer)+203*203 (second layer)+203*203 (third layer)+203*16 (fourth layer)=88914

Therefore, 88914−84744=4170 times (approximately 4 k) of multiply-accumulate processes can be added to the NN structure of the converted NN model 22 while keeping the same processing performance as the NN structure of the NN model 21.

As described above, the conversion unit 120 converts the layer parameter in such a way that the processing performance of the circuit, which executes the operations of the neural network, does not deteriorate and the computation amount in the neural network increases.

*Other Configurations*

First Modification Example

Figure 10:
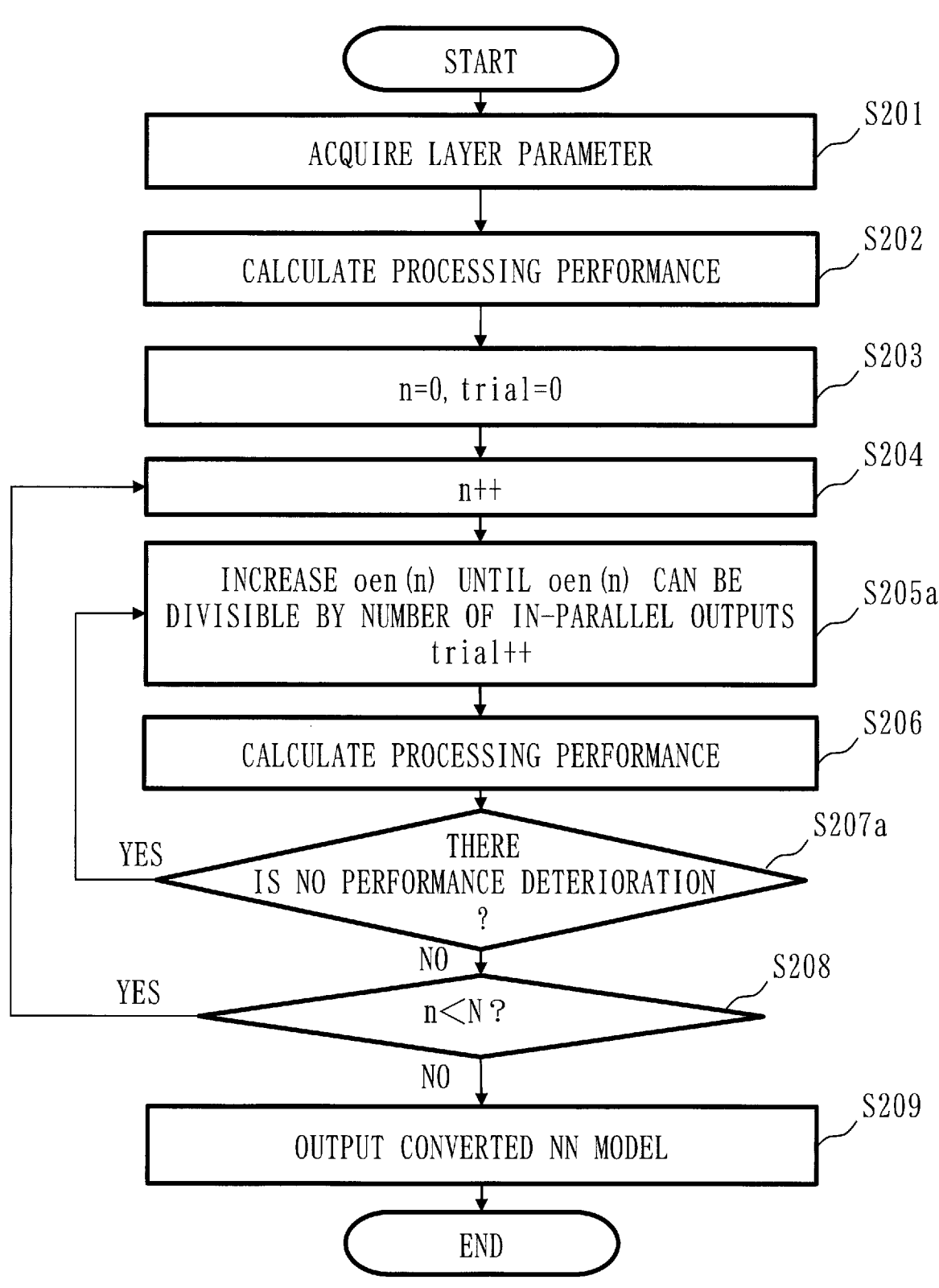
FIG. 10 is a flow diagram illustrating an operation example of a composition conversion process of the composition conversion apparatus according to a modification example of the first embodiment.

FIG. 10 is a flow diagram illustrating an operation example of a composition conversion process of the composition conversion apparatus 100 according to a modification example of the present embodiment.

In the present embodiment, the conversion unit 120 increases the computation amount by increasing the number of output edges one by one (step S205). However, as illustrated in FIG. 9, even when the numbers of output edges are increased to the next numbers divisible by the number of in-parallel outputs, there is a high possibility that the processing performance does not deteriorate.

Therefore, the conversion unit 120 may increase the number of input edges in each of the plurality of layers to the number divisible by the number of in-parallel inputs of the circuit and increase the number of output edges in each of the plurality of layers to the number divisible by the number of in-parallel outputs of the circuit. Specifically, the conversion unit 120 increases the computation amount in the n-th layer by increasing the number of output edges to the next number divisible by the number of in-parallel outputs.

In FIG. 10, processes of steps S201 to S204, step S206, and steps S208 to step S209 are the same as those in FIG. 7.

In step S205*a* in FIG. 10, the conversion unit 120 increases the number of output edges, oen(n), to the next number divisible by the number of in-parallel outputs.

When this process is written in a programming language specifically, it is to be as follows, for example.

While(oen(n) % the in-parallel number==0) oen(n)=oen (n)+1

Further, in step S207*a*, the conversion unit 120 determines whether or not Lat(trial) of the NN structure in which the number of output edges in the n-th layer has been increased to the number divisible by the number of in-parallel outputs has deteriorated from Lat(org) of the NN structure before the change. Specifically, following processes are performed.

If Lat(trial) has not deteriorated from Lat(org), the conversion unit 120 returns to step S205, further increases the number of output edges in the n-th layer, and repeats the subsequent processes.

If Lat(trial) has deteriorated from Lat(org), the conversion unit 120 proceeds to step S208. At this time, the conversion unit 120 proceeds to step S208 after restoring the number of output edges in the n-th layer to the previous number.

When the above-described process is written in a programming language specifically, it is to be as follows, for example.

If (Lat(org)<Lat(trial)) oen(n)=previous number and goto S208 else goto S205*a*

Second Modification Example

In the first modification example, the conversion unit 120 has increased the number of output edges, oen(n), to the next number divisible by the number of in-parallel outputs.

However, the conversion unit 120 may increase the number of output edges in such a way that the remainder after dividing the number of output edges, oen(n), by the number of in-parallel outputs becomes small.

Third Modification Example

In the present embodiment, the functions of the analysis unit 110, the conversion unit 120, and the output unit 130 are realized by software. As a modification example, the functions of the analysis unit 110, the conversion unit 120, and the output unit 130 may be realized by hardware.

FIG. 11 is a diagram illustrating a configuration of the composition conversion apparatus 100 according to a modification example in the present embodiment.

The composition conversion apparatus 100 includes an electronic circuit 909, the memory 921, the auxiliary storage device 922, the input interface 930, and the output interface 940.

The electronic circuit 909 is a dedicated electronic circuit which realizes the functions of the analysis unit 110, the conversion unit 120, and the output unit 130.

The electronic circuit 909 is specifically a single circuit, a composite circuit, a programmed processor, a parallel-programed processor, a logic IC, a GA, an ASIC, or an FPGA. GA stands for Gate Array. ASIC stands for Application Specific Integrated Circuit.

The functions of the analysis unit 110, the conversion unit 120, and the output unit 130 may be realized by one electronic circuit or may be distributed over a plurality of electronic circuits to be realized.

As another modification example, a part of the functions of the analysis unit 110, the conversion unit 120, and the output unit 130 may be realized by the electronic circuit, and the rest of the functions may be realized by the software.

Further, as another modification example, a part or all of the functions of the analysis unit 110, the conversion unit 120, and the output unit 130 may be realized by firmware.

Each of the processor and the electronic circuit is also referred to as processing circuitry. That is, in the composition conversion apparatus 100, the functions of the analysis unit 110, the conversion unit 120, and the output unit 130 are realized by the processing circuitry.

*Description of Effect of Present Embodiment*

Figure 12:
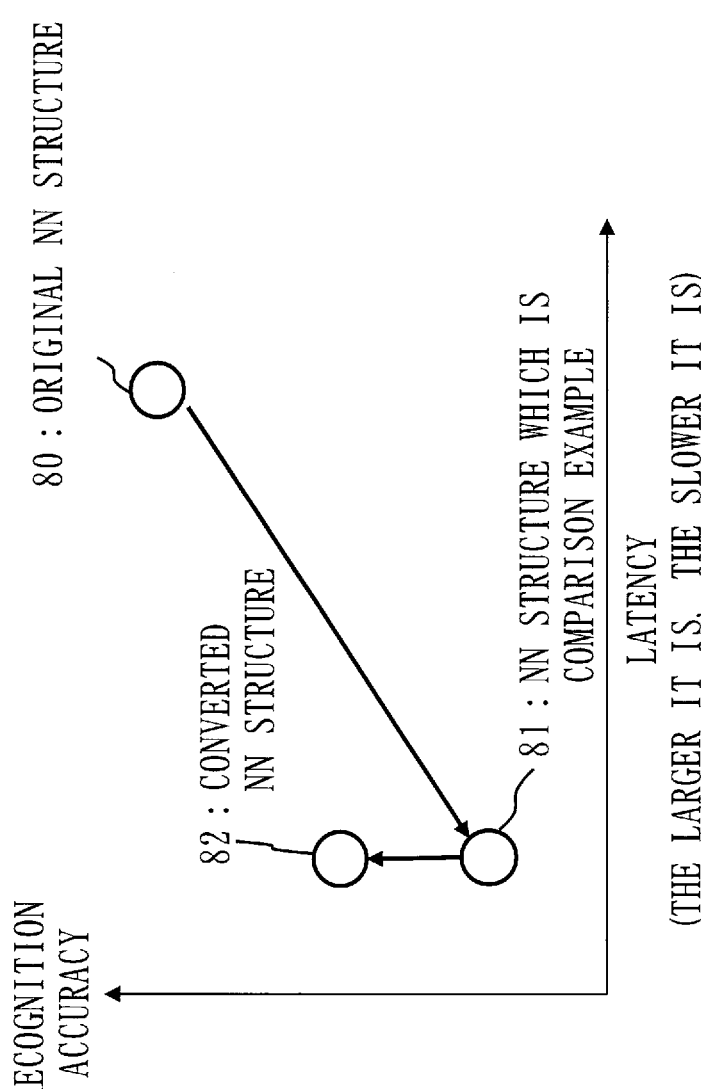
FIG. 12 is a diagram illustrating effect of the composition conversion apparatus according to the first embodiment.

FIG. 12 is a diagram illustrating effect of the composition conversion apparatus 100 according to the present embodiment.

As illustrated in FIG. 12, since latency of an original NN structure 80 is reduced, recognition accuracy also lowers in an NN structure 81 which is a comparison example. With a converted NN structure 82 according to the present embodiment, it is possible to improve the recognition accuracy without deteriorating the latency.

The composition conversion apparatus 100 according to the present embodiment is an apparatus which treats the model of the neural network as input and changes the neural network for hardware. The composition conversion apparatus 100 according to the present embodiment changes the numbers of input/output edges in such a way that the performance does not deteriorate and the numbers of input/output edges increase in a case where the numbers of input/output edges which are parameters in each layer which composes the neural network are executed by the hardware. Therefore, according to the composition conversion apparatus 100 according to the present embodiment, it is possible to improve the recognition accuracy while maintaining the performance.

In other words, the composition conversion apparatus 100 according to the present embodiment derives the parameters of the NN which do not influence the performance even when the scale (computation amount) of the NN is increased, from: a hardware configuration such as the number of pieces of in-parallel computation equipment in hardware which executes inference; and the NN subject to implementation. Then, the composition conversion apparatus 100 changes the scale of the NN to the larger one based on the derived parameters.

In the present embodiment, by an Ai inference function for hardware such as an FPGA, an ASIC, or a GPU which is an embedded device, it is possible to change the DNN subject to the implementation to the DNN which improves the recognition accuracy without increasing processing time and increasing a circuit scale in the hardware. Therefore, when there is an unused circuit, it is possible to change the NN so that the unused circuit is utilized effectively, and improve a recognition rate without deteriorating the performance.

Second Embodiment

In the present embodiment, mainly, matters different from the first embodiment and matters to be added to the first embodiment will be described.

In the present embodiment, the same reference numeral will be assigned to a configuration which has the same function as the first embodiment, and descriptions thereof will be omitted.

With reference to FIG. 13, a configuration example of a composition conversion apparatus 100b according to the present embodiment will be described.

The composition conversion apparatus 100b according to the present embodiment includes processing performance information 23 which associates each of the plurality of layer parameters 210 with processing performance of the circuit when each of the plurality of layer parameters 210 is used. The other configurations are the same as those in the first embodiment.

In the first embodiment, in step S102 and step S103 in FIG. 3, the conversion unit 120 calculates the processing performance based on the specific circuit configuration illustrated in FIG. 6.

However, there is a case where the circuit configuration of the hardware cannot be specified. In such a case, the conversion unit 120 acquires the processing performance corresponding to the layer parameters, using the processing performance information 23 in which the layer parameters and an actual measurement value of the processing performance of the circuit are set in advanced.

The conversion unit 120 acquires from the processing performance information 23, as the first processing performance, processing performance of the circuit when the first parameter 211 which is the current layer parameter 210 is used (corresponding to step S102). Further, the conversion unit 120 acquires from the processing performance information 23, as the second processing performance, processing performance of the circuit when the second parameter 212 in which the computation amount is increased from the first parameter 211 is used as the layer parameter 210 (corresponding to step S103). If the second processing performance has not deteriorated from the first processing performance, the conversion unit 120 treats the second parameter 212 as the first parameter 211 which is the current layer parameter, and repeats the processes.

In the composition conversion apparatus 100b according to the present embodiment, the performance when the parameters of the NN structure are executed by specific hardware has been made into a database in advance. Therefore, in the composition conversion apparatus 100b according to the present embodiment, the conversion unit 120 can acquire the processing performance corresponding to the layer parameters when the circuit configuration of the hardware cannot be specified.

Third Embodiment

In the present embodiment, mainly, matters different from the first and second embodiments and matters to be added to the first and second embodiments will be described.

In the present embodiment, the same reference numeral will be assigned to a configuration which has the same function as the first and second embodiments, and descriptions thereof will be omitted.

With reference to FIG. 14, a configuration example of a composition conversion apparatus 100c according to the present embodiment will be described.

The composition conversion apparatus 100c according to the present embodiment includes an activation performance table 24 in which performance of activation functions is set. The other configurations are the same as those in the first embodiment.

In the first embodiment, the computation amount in the NN structure is increased by treating the numbers of input/output edges in each of the plurality of layers in the NN structure as the layer parameter 210 and increasing the numbers of input/output edges.

In the present embodiment, the conversion unit 120 increases the computation amount in the NN structure by treating the activation function in each of the plurality of layers as the layer parameter 210 and converting the activation function into a function whose computation amount is larger than a current function.

Figure 15:
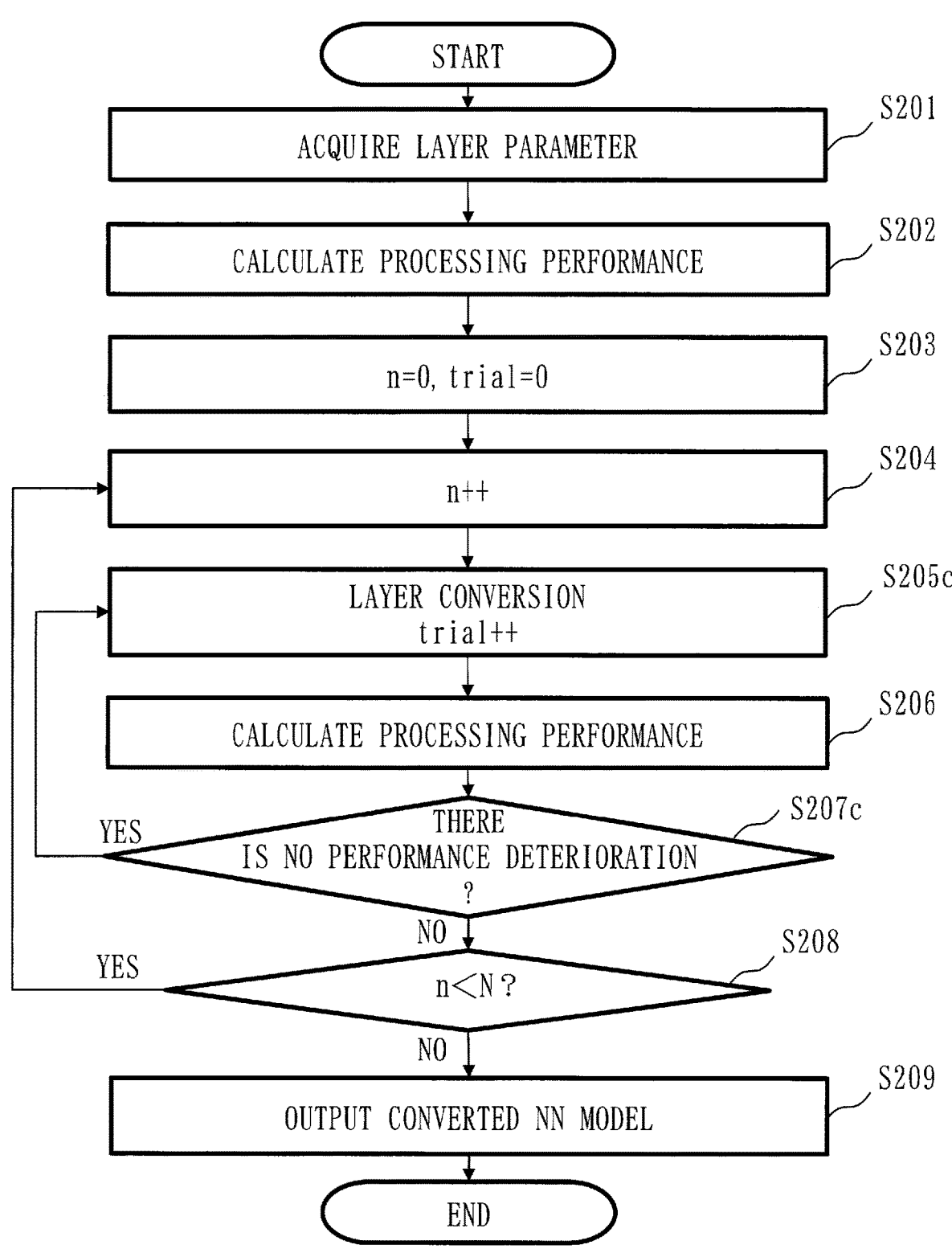
FIG. 15 is a flow diagram illustrating an operation example of a composition conversion process of the composition conversion apparatus according to the third embodiment.

FIG. 15 is a flow diagram illustrating an operation example of a composition conversion process of the composition conversion apparatus 100c according to the present embodiment.

In FIG. 15, processes of steps S201 to S204, step S206, and steps S208 to S209 are the same as those in FIG. 7.

In step S205c in FIG. 15, the conversion unit 120 converts an activation function in the n-th layer based on the activation performance table 24.

FIG. 16 is a diagram illustrating an example of increasing the computation amount without deteriorating the processing performance in the NN structure according to the present embodiment.

As illustrated in FIG. 16, in the activation performance table 24, types of activation functions, hardware performance of the activation functions, and computation scales are set.

The conversion unit 120 replaces the activation function in the n-th layer with an activation function whose computation scale is larger, if the hardware performance is the same.

In a specific example in FIG. 16, hardware performance of an activation function, ReLu, is 1, and computation scale is 2. Hardware performance of an activation function, Leaky ReLu, is 1, and computation scale is 3. Then, the conversion unit 120 replaces the activation function, ReLu, in the n-th layer in the NN structure with Leaky ReLu which has the same hardware performance and a larger computation scale.

Further, in step S207c, the conversion unit 120 determines whether or not Lat(trial) in the NN structure after the activation function has been replaced has deteriorated from Lat(org) in the NN structure before the replacement. Specifically, following processes are performed.

If Lat(trial) has not deteriorated from Lat(org), the conversion unit 120 returns to step S205c, further increases the computation scale of the activation function in the n-th layer, and repeats the subsequent processes.

If Lat(trial) has deteriorated from Lat(org), the conversion unit 120 proceeds to step S208. At this time, the conversion unit 120 proceeds to step S208 after restoring the activation function in the n-th layer to the activation function before the replacement.

The composition conversion apparatus 100c according to the present embodiment derives a type of layer (activation function) in the NN which does not influence the performance even when the scale (computation amount) of the NN is increased, from: a hardware configuration such as the number of pieces of in-parallel computation equipment in hardware which executes inference; and the NN subject to implementation. Then, the composition conversion apparatus 100 changes the scale of the NN to the larger one based on the derived type of layer.

According to the composition conversion apparatus 100c according to the present embodiment, it is possible to improve the recognition accuracy while maintaining the performance since the activation function is converted in such a way that the processing performance of the circuit does not deteriorate and the computation amount in the neural network increases.

In the above first to third embodiments, each unit of the composition conversion apparatus is described as an independent function block. However, the configuration of the composition conversion apparatus does not need to be a configuration as in the embodiments described above. The function blocks of the composition conversion apparatus may be of any configuration as far as it can realize the functions described in the above embodiments. Also, the composition conversion apparatus may form a system composed of a plurality of apparatuses instead of a single apparatus.

Further, a plurality of portions of the first to third embodiments may be combined and implemented. Alternatively, only one portion of these embodiments may be implemented. Furthermore, these embodiments may be combined in any manner as a whole or partially, and implemented.

That is, through the first to third embodiments, the individual embodiments may be combined in any manner, an arbitrary component in the individual embodiment may be modified, or an arbitrary component in the individual embodiment may be omitted.

Note that, the above-described embodiments are essentially preferred exemplifications and are not intended to limit the present disclosure, its applied product, and a scope of usage, and various modifications can be made as necessary.

REFERENCE SIGNS LIST

21: NN model, 22: converted NN model, 23: processing performance information, 24: activation performance table, 80, 81, 82: NN structure, 100, 100b, 100c: composition conversion apparatus, 110: analysis unit, 120: conversion unit, 130: output unit, 140: storage unit, 210: layer parameter, 211: first parameter, 212: second parameter, 909: electronic circuit, 910: processor, 921: memory, 922: auxiliary storage device, 930: input interface, 940: output interface, 950: communication device.

The invention claimed is:

1. A composition conversion apparatus comprising: processing circuitry
to analyze a composition of a neural network composed of a plurality of layers and acquire a layer parameter indicating an attribute of each of the plurality of layers;
to convert the layer parameter in such a way that processing performance of a circuit which executes an operation of the neural network does not deteriorate and a computation amount of the neural network increases, and increase the computation amount by treating the numbers of input/output edges in each of the plurality of layers as the layer parameter and increasing the numbers of input/output edges; and
to increase a number of input edges in each of the plurality of layers to a first number divisible by a number of in-parallel inputs in the circuit and increase a number of output edges in each of the plurality of layers to a second number divisible by a number of in-parallel outputs in the circuit.

2. The composition conversion apparatus according to claim 1,
wherein the processing circuitry increases the computation amount by treating an activation function in each of the plurality of layers as the layer parameter and converting the activation function into a function whose computation amount is larger than a current function.

3. The composition conversion apparatus according to claim 1,
wherein the processing circuitry calculates as first processing performance, the processing performance, using a first parameter which is the layer parameter which is current, calculates as second processing performance, the processing performance, using as the layer parameter, a second parameter whose computation amount is increased from the first parameter, and when the second processing performance has not deteriorated from the first processing performance, treats the second parameter as the layer parameter which is current.

4. The composition conversion apparatus according to claim 1, comprising processing performance information which associates each of a plurality of layer parameters with processing performance of the circuit when each of the plurality of layer parameters is used,
wherein the processing circuitry acquires from the processing performance information, as first processing performance, the processing performance of the circuit when a first parameter which is the layer parameter which is current is used, acquires from the processing performance information, as second processing performance, the processing performance of the circuit when a second parameter whose computation amount is increased from the first parameter is used as the layer parameter, and when the second processing performance has not deteriorated from the first processing performance, treats the second parameter as the layer parameter which is current.

5. The composition conversion apparatus according to claim 1,
wherein the circuit is an FPGA (Field Programmable Gate Array).

6. A composition conversion method used for a composition conversion apparatus which is a computer, comprising:

analyzing a composition of a neural network composed of a plurality of layers and acquiring a layer parameter indicating an attribute of each of the plurality of layers; and converting the layer parameter in such a way that processing performance of a circuit which executes an operation of the neural network does not deteriorate and a computation amount of the neural network increases, and wherein the computer treats numbers of input/output edges in each of the plurality of layers as the layer parameter and increases the numbers of input/output edges by increasing a number of input edges in each of the plurality of layers to a first number divisible by a number of in-parallel inputs in the circuit and increasing a number of output edges in each of the plurality of layers to a second number divisible by a number of in-parallel outputs in the circuit.

7. A non-transitory computer readable medium storing a composition conversion program used for a composition conversion apparatus which is a computer, which causes the computer to execute:

an analysis process of analyzing a composition of a neural network composed of a plurality of layers and acquiring a layer parameter indicating an attribute of each of the plurality of layers; and a conversion process of converting the layer parameter in such a way that processing performance of a circuit which executes an operation of the neural network does not deteriorate and a computation amount of the neural network increases, and wherein the conversion process treats numbers of input/output edges in each of the plurality of layers as the layer parameter and increases the numbers of input/output edges by increasing a number of input edges in each of the plurality of layers to a first number divisible by a number of in-parallel inputs in the circuit and increasing a number of output edges in each of the plurality of layers to a second number divisible by a number of in-parallel outputs in the circuit.

* * * * *